Jan. 24, 1956   C. J. PORTH   2,731,757
VARIABLE ACTION BAIT
Filed Sept. 1, 1951
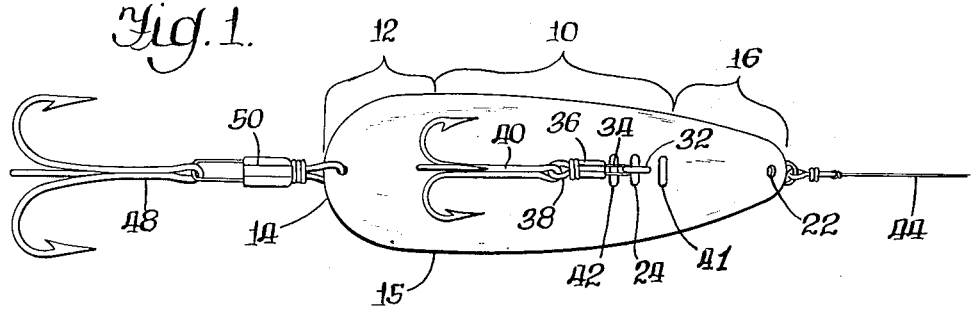
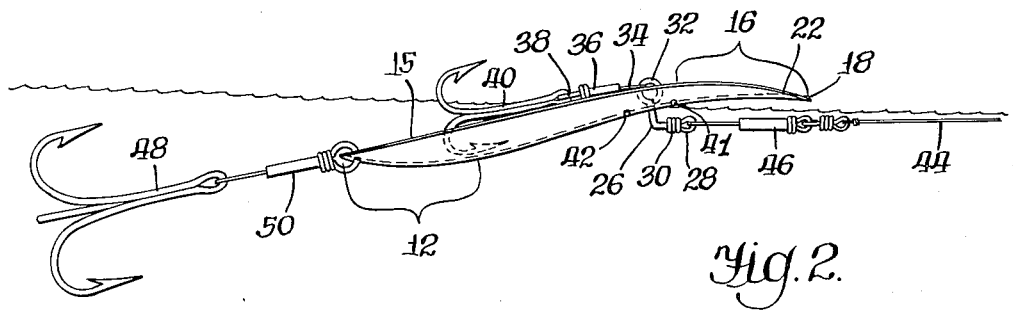
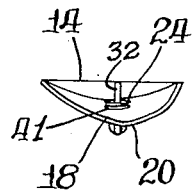
INVENTOR.
Carl J. Porth
BY
Donald A. Sweet   Atty.

United States Patent Office 2,731,757
Patented Jan. 24, 1956

2,731,757

VARIABLE ACTION BAIT

Carl J. Porth, West Bend, Wis.

Application September 1, 1951, Serial No. 244,777

2 Claims. (Cl. 43—42.52)

My invention relates to fishing and includes among its objects and advantages an extension in the different kinds of action that can be secured in artificial lures. In the accompanying drawings, Figure 1 is a plan view of a lure embodying the invention;

Figure 2 is a side elevation of the same lure; and

Figure 3 is a view of the front end of the spoon of Figure 2 and its fastening member.

The type of spoon illustrated is the conventional and well known spoon. This includes a body portion indicated in Figure 1 by a bracket 10. The body portion has a slight taper, but except for that it is uniform throughout its length and of arcuate cross section with the concavity upward. Behind the main section is the stern 12 having a shape approximating a segment of a spherical shell, with its rear edge 14 lying substantially in the same plane with edges 15 of the sides of the main portion 10. In front of the main portion 10 is the pilot portion 16. It is believed to be the irregularity of this portion that imparts to the entire spoon its peculiarly irregular and advantageous movement when pulled forward through the water. The pilot section 16 is curved gently downward as indicated in the drawings, and its transverse radius of curvature is materially greater than that of the body 10, and its extreme tip 18 is twisted a few degrees by rotation around the longitudinal axis of the lure. The lowest point 20 of the curve of the pilot portion, as best indicated in Figure 3, is offset a little to one side of a vertical plane passing through the longitudinal axis of the lure. The ordinary and intended use of the spoon is with the lure completely submerged. In this condition the very slight spiral twisting of the tip 18 tends to twist the lure in the direction of a spiral movement. However, this tendency only rarely achieves a complete rotation of the lure around its longitudinal axis. Most of the time it rocks back and forth, and does not quite succeed in turning over completely. When the speed is quite slow, the sinking of the lure due to its own weight increases the back and forth movement, and a complete rollover is still less frequent. As the slow speed used to let the lure sink into the water is changed to trolling speed such that the lure sinks no farther or works back up a little, the relative power of the different parts to produce the different movements changes, and this further increases the erratic character of the movements of the spoon. The foregoing description portrays the action of the spoon when it is used in the conventional way with the pulling instrumentality attached in the small hole 22 of the tip 18. Slight changes in the area and tilt of the tip 18, are enough to produce material variations in the frequency with which the lure will roll over.

According to the invention, the point of attachment is moved back to approximately one-third of the distance from the front to the rear end of the spoon and to a point roughly coinciding with the mean center of pressure effective on the lure at medium speed as it travels through the water. Because slight changes in speed change the center of pressure, it becomes possible to achieve several advantageous manipulations with a spoon pulled in this way that are not possible when the line is attached through the hole 22. I have illustrated a transverse slot 24 substantially at the fore and aft position where the desired action is effectively produced.

A suitable tension connection is employed to connect the line to the lure. I have illustrated a wire connector 26 bent to a sharp dog leg. The lower portion extends forward to define an eyelet 28 with the end of the wire coiled at 30 to form a lump too large to pass through the slot 24. The other end of the wire extends up through the transverse slot 24 and ends in a loop 32 lying in the same plane as the connector, and the returning end of the wire is juxtaposed or soldered to the wire coming up through the slot to define a shape that can be withdrawn through the slot 24 by rotating the connector 26 ninety degrees to bring the loop 32 into the same plane as the transverse slot.

In use in the water, such detachment is impossible, because the bail 34 of the clip 36 always lies at an angle to the eye 32 so that there is no position where the assembly can be withdrawn through the slot 24. The eye 38 of the clip 36 is shown engaged with the front end of a conventional gang hook 40.

I prefer to supply my improved lure with an additional slot 41 a little in front of the slot 24 and another slot 42 a little behind the slot 24. The slots 41 and 42 allow for changing the action a little, depending on the speed of movement and the roughness of the water, but all three are close enough to the center of pressure to keep the lure at the water surface and to secure erratic action at the surface. I believe that ripples, slapping the pilot portion 16 at irregular intervals, are primarily responsible for the remarkably irregular action that can be secured in this way.

I have indicated the line 44 detachably connected to the eyelet 28 by a conventional clip 46. A conventional trailing gang hook 48 may be connected to the spoon with a conventional split ring, but I prefer to assemble a clip 50 in place of the split ring to permit the user to substitute other attachments at this point more quickly. The same applies to the top gang hook 40. The spoon conventionally connected can be made to run along the surface as in position number 5 by keeping the line 44 at a good upward inclination, but when this is done, the spoon loses all its attractive movements, and simply plows along with no sideways movement at all. The same applies to many other well known lures. However, with the connection moved back, and according to the invention, the lure will work up to the surface and will sidle from side to side at the surface with rather wide sweeps of irregular extent. I believe the usual irregularity of the sidling action is because, at the time the angularity of the line resulting from a sweep to one side is about to end that sweep, the time of reversal depends on the time when a ripple happens to slap the nose 18. Whether this theory is correct or not, the attractive irregular surface movement of such a lure, and its tendency to come up to the surface at moderate trolling speeds, are practical facts, easily ascertainable by test.

It will be apparent that locating the point where pull is applied to the spoon back near the center of pressure, conditions the spoon itself into a position where its equilibrium is so nearly neutral that relatively slight extraneous disturbing forces can cause large deviations. The advantages of such a connection are not necessarily limited to spoons of the instant type. In any such lure, the irregularity of action is a minimum with the line attached at the front tip in the conventional way. As the point of attachment is moved back, the action becomes more and more erratic, until a critical point is reached beyond which the lure becomes uncontrollable.

Others may readily adapt the invention for use under various conditions of service by employing one or more of the novel features involved, or equivalents thereof.

With respect to the apparent scope of my invention, I desire to claim the following subject matter:

1. A diving surface lure comprising, in combination: a one-piece concavo-convex body formed of sheet material and having a central main upwardly concave portion extending longitudinally; a stern portion at the rear of said central portion and integral therewith; said stern portion being upwardly concave and merging smoothly with said central portion and having an arcuate marginal edge defining the trailing edge of the body; whereby said portions, when trailing along on the surface of the water, tend to automatically maintain themselves with their concavities facing away from the water, in the direction herein identified as up; a pilot portion at the front end of said main portion; said pilot portion merging smoothly with said main portion and being upwardly concave throughout at least the rear part of its longitudinal extent; the forward end of said pilot portion having its upper surface curving downwardly; line attachment means for towing said lure projecting downwardly from the convex side of said central portion substantially midway between the sides thereof and substantially at the front end thereof; and hook means attached to said trailing edge of said stern portion.

2. A lure according to claim 1 in which said line attachment means projects downward away from the longitudinal axis of said central and stern portions at least as far as said pilot portion is curved away from the same axis; whereby the line is offset when under tension in normal trolling use to keep it from fouling the tip of said pilot portion.

References Cited in the file of this patent
UNITED STATES PATENTS

| | | |
|---|---|---|
| 632,554 | Dukes | Sept. 5, 1899 |
| 966,068 | Williamson | Aug. 2, 1910 |
| 1,309,966 | Sebenius | July 15, 1919 |
| 1,499,975 | Ford | July 1, 1924 |
| 1,854,028 | Gruenhagen | Apr. 12, 1932 |
| 1,862,917 | Anderson | June 14, 1932 |
| 1,997,802 | Meyer | Apr. 16, 1935 |
| 2,168,476 | Hartung | Aug. 8, 1939 |
| 2,254,981 | Sisco | Sept. 2, 1941 |
| 2,463,889 | Lundemo | Mar. 8, 1949 |
| 2,514,938 | Craig | July 11, 1950 |
| 2,535,211 | Jelinek | Dec. 26, 1950 |
| 2,538,484 | Tenn | Jan. 16, 1951 |
| 2,559,542 | Mintner | July 3, 1951 |
| 2,566,029 | Louthan | Aug. 28, 1951 |
| 2,574,529 | Carter | Nov. 13, 1951 |
| 2,596,959 | Roes | May 13, 1952 |
| 2,597,035 | Rickard | May 20, 1952 |
| 2,618,096 | Wagner | Nov. 18, 1952 |
| 2,650,450 | Grathwohl | Sept. 1, 1953 |